(12) United States Patent
Sievert et al.

(10) Patent No.: US 7,146,414 B1
(45) Date of Patent: Dec. 5, 2006

(54) OBJECT BRIDGE FOR PROVIDING ACCESS TO OPERATIONS-LEVEL CONTROL OF A DATA PROCESSING SYSTEM

(75) Inventors: James A. Sievert, Lino Lakes, MN (US); Douglas P. Van Vreede, Vadnais Heights, MN (US)

(73) Assignee: Unisys Corporation, Blue Bell, PA (US)

( * ) Notice: Subject to any disclaimer, the term of this patent is extended or adjusted under 35 U.S.C. 154(b) by 811 days.

(21) Appl. No.: 10/289,024

(22) Filed: Nov. 6, 2002

(51) Int. Cl.
*G06F 15/173* (2006.01)
(52) U.S. Cl. .................................... 709/223; 709/224
(58) Field of Classification Search ............... 709/223, 709/224, 226, 204; 705/1; 714/39, 47; 702/186
See application file for complete search history.

(56) References Cited

U.S. PATENT DOCUMENTS

| | | | | |
|---|---|---|---|---|
| 5,621,663 | A * | 4/1997 | Skagerling | 702/186 |
| 2002/0059407 | A1 * | 5/2002 | Davies | 709/223 |
| 2002/0138571 | A1 * | 9/2002 | Trinon et al. | 709/204 |
| 2002/0161875 | A1 * | 10/2002 | Raymond | 709/223 |
| 2003/0065986 | A1 * | 4/2003 | Fraenkel et al. | 714/47 |
| 2003/0097617 | A1 * | 5/2003 | Goeller et al. | 714/39 |
| 2003/0105850 | A1 * | 6/2003 | Lean et al. | 709/223 |
| 2003/0135382 | A1 * | 7/2003 | Marejka et al. | 705/1 |

* cited by examiner

*Primary Examiner*—Le Hien Luu
(74) *Attorney, Agent, or Firm*—Charles A. Johnson; Mark T. Starr; Crawford Maunu PLLC

(57) ABSTRACT

A method and apparatus for operating a server system. In one embodiment a server-control element is coupled to the server system and is configured to provide access to management functions for managing the server system. The server-control element generates event reports in response to status data received from the server system, each event report containing status data indicative of an operational characteristic of the server system. A bridge is coupled to the server-control element and is configured to register with the server-control element to receive events reports. The bridge stores data from the event reports. Command requests received from a bridge-type client by the bridge are submitted to the server-control element, the commands specified by the command requests for invoking the management functions. The bridge provides the stored data from event reports to the bridge-type client in response to requests for the stored data.

18 Claims, 5 Drawing Sheets

OBJECT BRIDGE FOR PROVIDING ACCESS TO OPERATIONS-LEVEL CONTROL OF A DATA PROCESSING SYSTEM

FIELD OF THE INVENTION

The present invention generally relates to operating data processing systems.

BACKGROUND OF THE INVENTION

Large-scale computer systems often host multiple applications that support many users. Example applications include database applications, file servers, and software services. Some large-scale computer systems are controlled and managed by operators. "Users" are those who rely on the services provided by a system, and "operators" are those who are those responsible for keeping the systems operational. Example actions taken by an operator include, controlling the availability of hardware units in a running system, specifying those hardware units that are controlled by a single instance of an operating system, and responding to alerts output by the system.

Some systems provide an interface through which operations-level control of a system can be exercised over a network by client programs. For example, ES7000 systems from Unisys include a service processor that executes a server control program. The server control program is available for client programs that seek to control some aspect of the system. Depending on the application, the client programs may support automated operations of the system or provide a user-interface for an operator.

The interface through which a client program affects system operations can be complex. For example, even though a client may need nothing more than a single piece of status information, the client may have to adhere to a complex protocol in order to obtain the desired information. In addition, the interface may only support client programs written in a particular programming language, thereby limiting the flexibility in developing new client programs. Once a client program is developed in accordance with the protocol of the interface, any change in the protocol in subsequent versions of the interface would require corresponding changes in the client programs.

A method and apparatus that addresses the aforementioned problems, as well as other related problems, are therefore desirable.

SUMMARY OF THE INVENTION

The present invention provides support for operating a server system. In one embodiment a server-control element is coupled to the server system and is configured to provide access to management functions for managing the server system. The server-control element generates event reports in response to status data received from the server system, each event report containing status data indicative of an operational characteristic of the server system. A bridge is coupled to the server-control element and is configured to register with the server-control element to receive events reports. The bridge stores data from the event reports. Command requests received from a bridge-type client by the bridge are submitted to the server-control element, the commands specified by the command requests for invoking the management functions. The bridge provides the stored data from event reports to the bridge-type client in response to requests for the stored data.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention provide an interface for access to operations-level control of a data processing system. It is recognized that there exist different categories of actions performed on large-scale data processing systems. For example, users make use of the hardware and software resources of a system for user-specific purposes. Example user-level uses of the system include use of the storage resources, use of software services, and use of computational services for user-specific purposes. The actions performed by operators differ from the actions performed by users. The actions of operators are generally performed for the purpose of managing the system resources that are made available for the users. Example operator-type actions include controlling the availability of hardware units to users, establishing a hardware configurations for an instance of the operating system, and responding to system-generated alert messages.

In one embodiment, a bridge component is provided for managing the details of the interface for performing operator-type functions. This permits a variety of client programs to be developed without having to handle the complexities of the interface protocol. This bridge component also allows clients to be written in different languages, which permits the selection of the language most suitable for the desired function. In another embodiment, the bridge component supports different versions of the interface, which eliminates the need to update every client when the interface changes. Instead, the bridge is updated to handle the new version of the interface.

Figure 1:
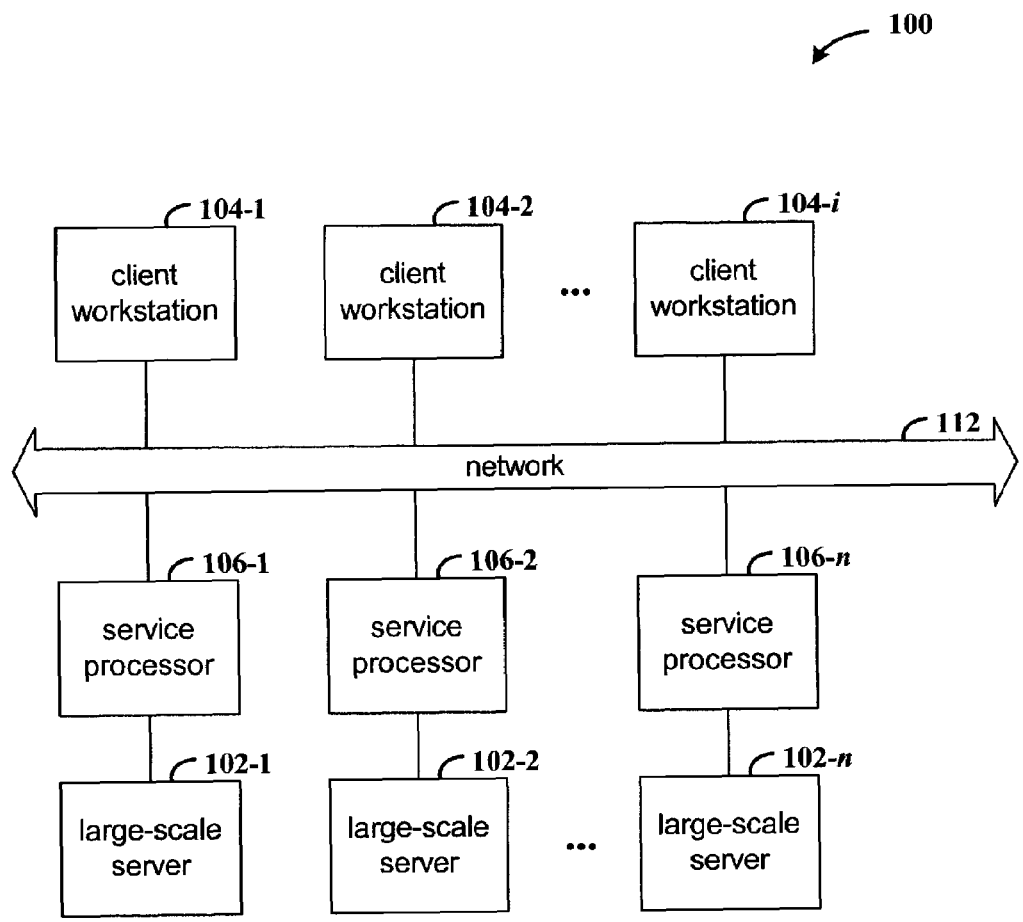
FIG. 1 is a functional block diagram of a computing arrangement in which multiple large-scale servers are controllable via client workstations.

FIG. 1 is a functional block diagram of a computing arrangement 100 in which multiple large-scale servers 102-1–102-*n* are controllable via client workstations 104-1–104-*i*. In one embodiment, each of the large-scale servers is coupled to an associated service processor 106-1–106-*n*. The service processors provide an interface for performing operations-level actions on the servers by client programs executing on the client workstations. The service processors can be connected to client programs executing on any one or more of the client workstations, and a client program can be connected to any one or more of the service processors. The characteristics of network 112 (e.g., LAN vs. WAN, dedicated vs. shared, etc.) depend on the implementation requirements of the computing arrangement.

Figure 2:
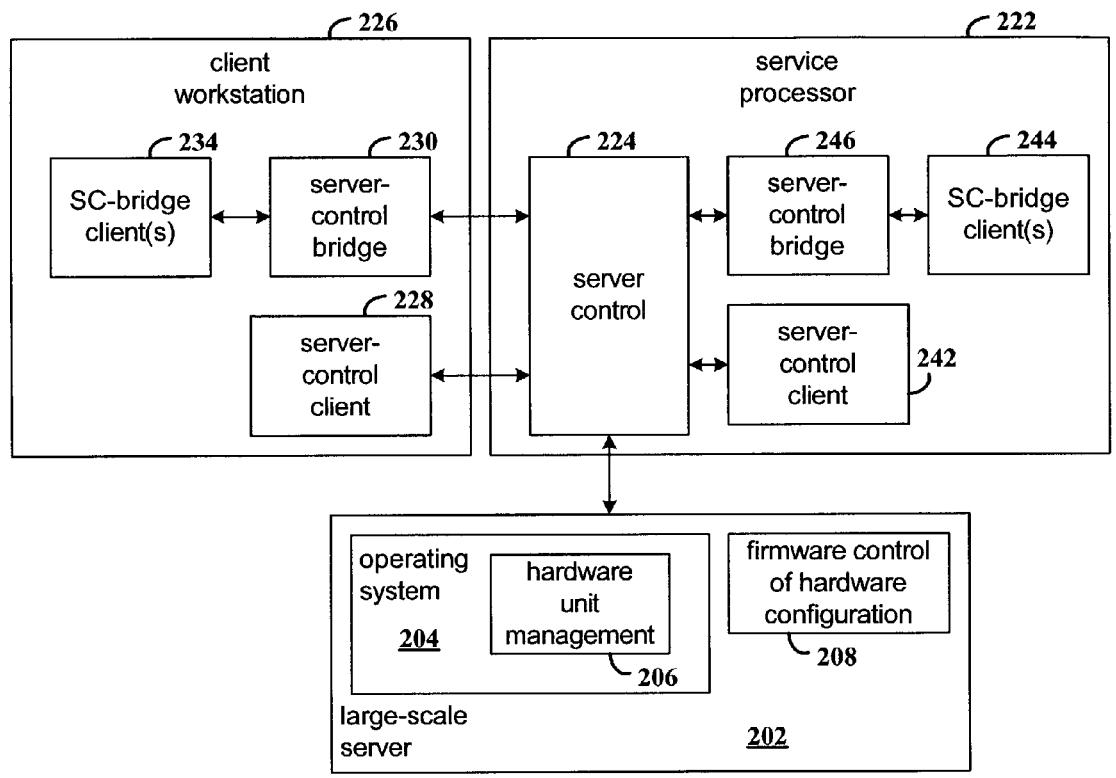
FIG. 2 is a functional block diagram of the components involved in providing an operations-level interface to a large-scale server in accordance with one embodiment of the invention.

FIG. 2 is a functional block diagram of the components involved in providing an operations-level interface to a large-scale server 202 in accordance with one embodiment of the invention. The large-scale server hosts an operating system 204 for managing the resources of the server. The operating system includes functions for managing the hardware units of the server. For example, through the hardware management unit 206 an operator controls which hardware units (not shown), such as CPUs, storage devices, and I/O channels of the server, are made available to users. A separate block 208 illustrates the functions that are separate from the operating system and that are used to establish and manage hardware configurations for the server. For example, servers such as Unisys ES7000 servers can be partitioned into multiple servers, each running with an independent instance of the operating system. The partitions are managed through the firmware control component 208.

The service processor 222 is coupled to the server 202 via a dedicated management interface. In one embodiment, the service processor itself is a small-scale computing system that hosts a server control program 224. The server control program provides the interface to the functions for operations-level management of the server 202. Example types of management functions include setting system attributes, managing partitions, configuring memory arrangements, managing hardware units, and managing alerts from the server 202.

The system attributes that can be set via the server control include, for example, the system name, system firmware, recovery behavior, and power domain management. Partition management functions include installing, creating, and deleting partitions. Configuring a memory arrangement includes tasks such as defining a logical grouping of memory storage units for a partition. In addition to the forgoing operations-level management functions, the server control also provides an interface for controlling access to hardware units and managing server alerts.

In an example configuration, a client workstation is coupled to the service processor and configured to execute a server-control client 228. Example functions provided by server-control clients include providing an operator user interface, automating selected operator actions, and processing alerts from the server control. A server-control client interfaces directly with the server control and provides access to some function for operating the server 202. The server-control client is shown to illustrate the various protocol-type functions that a server-control client must manage in interacting with the server control 224 in order to perform the designated operations-level actions on the server 202.

In order to perform operator-level functions on server 202 via the server control, the server-control client must first register with the server control to receive event reports. The server control reports system status information to registered server-control clients via event reports, which are generated in response to status information received from the server 202. After a server-control client registers with the server control, the server control informs the client of configuration information that describes partitions and identifies all hardware units and power domains. The server-control client must maintain the configuration information if needed for future reference. In registering to receive event reports from the server control, the server control will send all event reports to the server-control client. Thus, the server-control client must process all event reports, even if only certain types are of interest for a particular function.

Through the server-control client, operators can enter commands for initiating management functions on the server 202. In an example server, command handling is through an asynchronous interface. The server informs the server control whether an input command has been accepted, when the command is executed, and when execution of the command is complete. Thus, the server-control client must be configured to handle the different stages of command processing.

To simplify the manner by which management functions of the server 202 can be performed, a server-control bridge 230 handles the interaction with the server control 224, while an SC-bridge client 234 accesses the management functions provided by the server control 224 via the server-control bridge. The server-control bridge provides an alternative way for client programs to access the server control. The server-control bridge registers to receive event reports and handles the event reports received from the server control. The SC-bridge client need only request information from the server-control bridge without having to manage event reports and other details of the interface.

The server-control bridge 230 supports scripting languages such as VBScript and Jscript, and other languages that use IDispatch interfaces. In addition, server-control bridge provides an object model that is much more simple than the server control object model, which should lead to reduced complexity in client code. The server-control bridge also isolates clients from changes to the underlying API of the server control. In one embodiment, the SC bridge is an in-process COM Server that provides IDispatch, COM and .NET native interfaces on top of the native server control DCOM interfaces.

In the example embodiment, the service processor 222 is a computer system. This permits a server-control client 242 and an SC-bridge client 244 to be hosted on the service processor, where the server-control client and SC-bridge client implement desired functions for operating the server 202. The service processor also hosts an instance 246 of the server control bridge for providing the SC-bridge client access to the server control.

Figure 3:
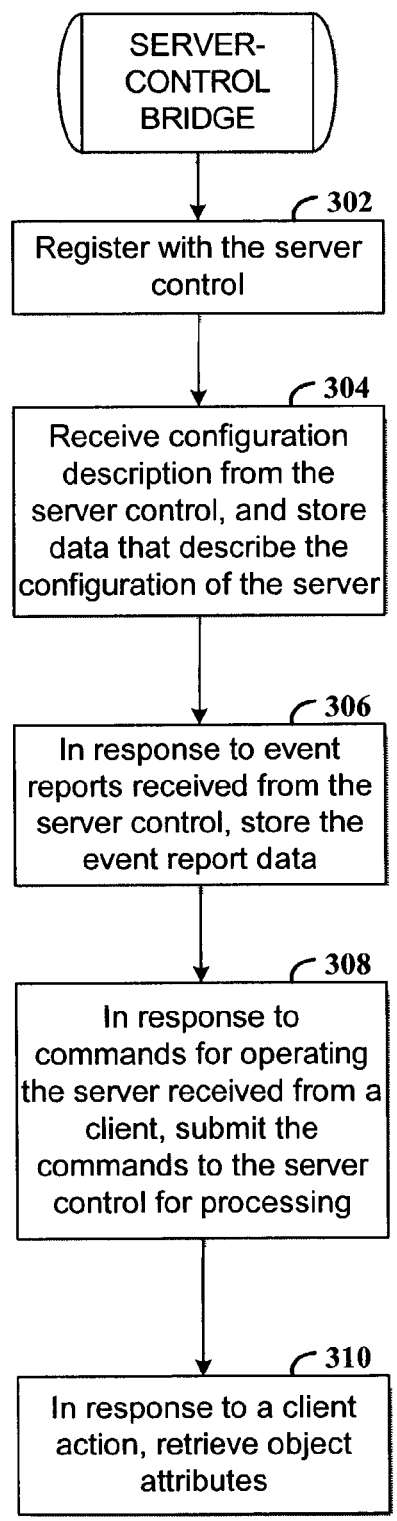
FIG. 3 is a flowchart of an example process performed by the server-control bridge in providing an interface to the server control.

FIG. 3 is a flowchart of an example process performed by the server-control bridge in providing an interface to the server control. In interacting with the server control, the server-control bridge operates in much the same way as a server-control client (e.g., FIG. 2, 228). Generally, the server-control bridge handles the bookkeeping-type tasks associated with interacting with the server control. This relieves the SC-bridge client from performing the bookkeeping-type operations. In addition, the server-control bridge supports SC-bridge clients written in different languages and isolates the SC-bridge clients from changes in the server control.

The server-control bridge registers with the server control to receive event reports for a specified server (step 302). In response, the server control provides configuration information that describes the server, and the server-control bridge stores the information for later reference (step 304).

Steps 306, 308, and 310 generally describe the processing by the SC bridge in response to event reports, commands, and requests for attributes. The SC bridge, in response to event reports received from the server control, stores the event report data (step 306). Example event report data include alerts, state and property changes to objects, and changes to hardware configuration. In response to server commands submitted via classes of the bridge, the SC bridge submits the commands to the server control for initiation with the large-scale server (step 308). Each of these bridge classes describe methods that can be executed and result in server commands being submitted.

Figure 4:
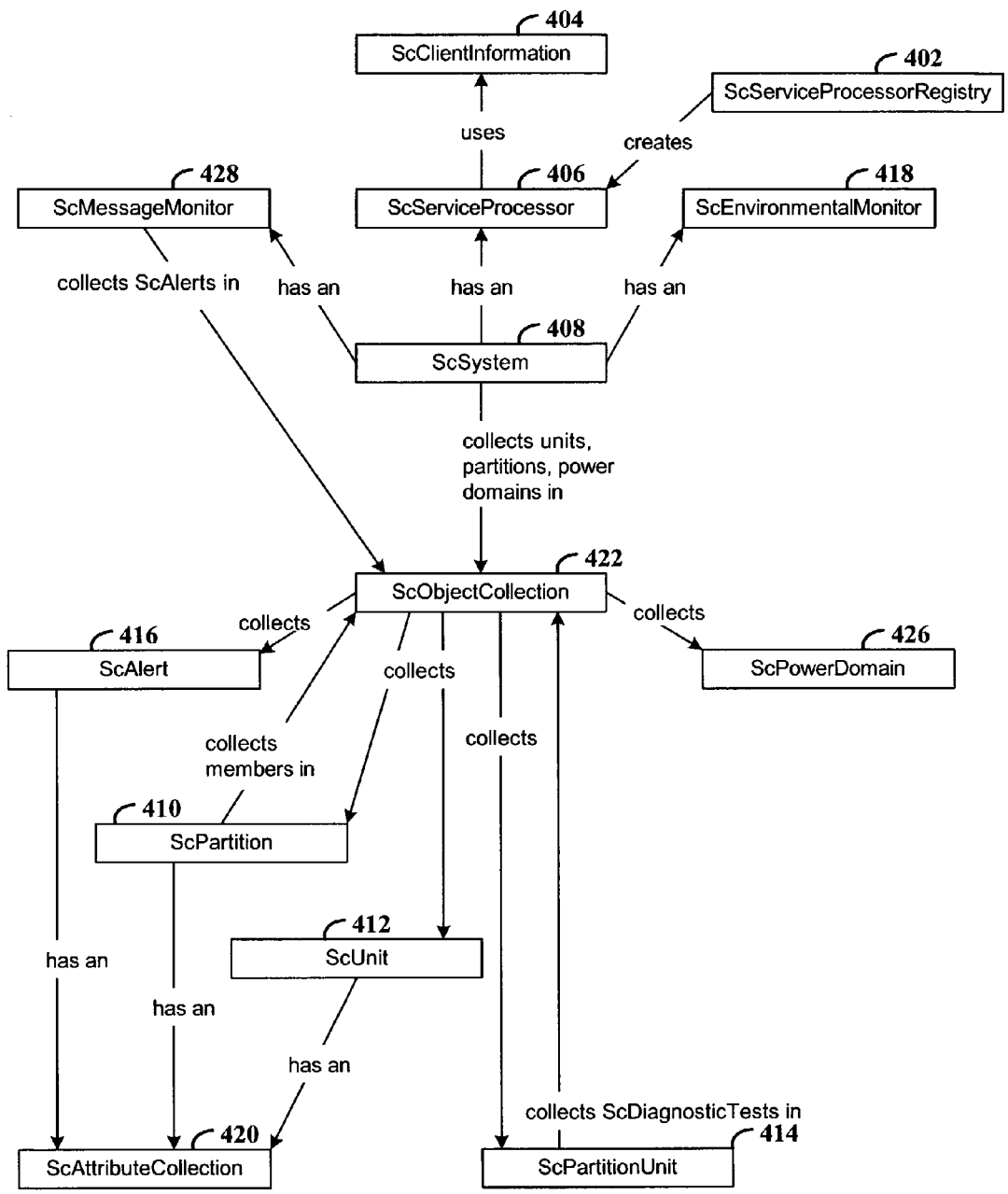
FIG. 4 illustrates the relationships between the classes used to implement the SC bridge in accordance with one embodiment of the invention.

FIG. 4 illustrates the relationships between the classes used to implement the SC bridge in accordance with one embodiment of the invention. In addition to descriptions of the classes, some sample program code is interspersed to explain how to use some of the SC bridge features. Even though the code samples are written in VBScript, the concepts are applicable to any language.

The SC Bridge exposes seven major classes of objects, which include: ScServiceProcessorRegistry, ScServiceProcessor, ScSystem, ScPowerDomain, ScCommand, ScPartition, ScUnit, and ScPartitionUnit. ScCommand does not appear because it is created in response to client commands, whereas the other classes represent objects in server control. ScCommand is associated with ScSystem, ScPartition, and ScPowerDomain objects since those objects support commands. Two classes that expose system-wide alert messages and environmental information include: ScAlert, and ScEnvironmentalMonitor. Two classes are provided for the collection of objects: ScAttributeCollection, and ScObjectCollection. The ScClientInformation class supports client identification.

The ScServiceProcessorRegistry class 402 provides for the creation of an ScServiceProcessor object that in turn allows access to the complete underlying Server control object model. A client gains access to an instance of an ScServiceProcessor by creating an instance of an ScServiceProcessorRegistry and calling one of the Attach methods. An example of this using VBScript commands is shown in Listing 1.

'Obtain an instance of the ScServiceProcessorRegistry
    set    spr=CreateObject("ScServer.ScServiceProcessorRegistry")
    'Connect to Server control running on a Service processor named "rv-mip1".
    mipName="rv-mip1"
    set sp=spr.Attach_2(mipName)
    Listing 1

The ScServiceProcessorRegistry class supports the following methods: Attach, Attach_2, Attach_3, Attach_4, and Invalidate. A client gains access to Server control running on a specific SC Service processor using Attach. The Attach is an overloaded method and allows a client to connect to a service processor in a variety of ways. Calling Attach( ) with no parameters attempts a connection to the same host on which the client is running. Attach_2 takes one parameter that is the name or IP address of the remote service processor to attach to. Attach_3 accepts an ScClientInformation object as a single parameter. Finally, Attach_4 takes two parameters, the name or IP address of a remote service processor and an ScClientInformation object. Attach ("localhost") is equivalent to Attach( ). The ScClientInformation object allows a client to specify the client-id and language, with the default being the current culture setting of the client machine.

The ScServiceProcessorRegistry object supports multiple simultaneous client connections to different service processors on different machines. For example, a client can create one ScServiceProcessorRegistry object, and then use the same object to attach to two different server control instances running on different machines. Clients that have previously connected to a server control using Attach can detach from that server control through Invalidate. Invalidate frees any server control resources currently held by the SC bridge on behalf of the client.

The ScClientInformation class 404 allows the client program to alter the default values of the client-id and language used by the server control. This class must be created and its properties updated before connecting to the server control by calling ScServiceProcessorRegistry.Attach.

The ScServiceProcessor object (class 406) is created when the caller successfully attaches to the service processor via the ScServiceProcessorRegistry object. The ScServiceProcessor object supports the following properties: ClientInformation, ConnectionMonitor, and System.

The ClientInformation property returns an ScClientInformation object containing the current client-id and language settings of a client. Once connected to a service processor, the client can only retrieve, not change these settings. If a change to these settings is needed, the client must first create this object; specify the settings to be changed, and then pass the object to one of the ScServiceProcessorRegistry Attach methods.

The ConnectionMonitor object (class not shown) provides a way for the client to determine the status of the service processor connection. Communication between the client program and a service processor may be infrequent. However, clients often need to be aware of a failure at the service processor. The ConnectionMonitor class provides an IsConnectionValid method which is used to detect service processor failures in an unobtrusive manner.

The System property returns an instance of the ScSystem object. The ScSystem object is the root object that provides access to subordinate objects such as partitions, hardware units, power domains, alerts and environmental status. Listing 2 illustrates the VBScript commands for connecting to a server control and obtaining the ScSystem object.

'Obtain an instance of the ScServiceProcessorRegistry set    spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Do further processing here.

. . .

. . .

'All Done, Get Rid of Everything set system=nothing set sp=nothing
    Listing 2

The ScSystem class 408 provides access to the server control System class. There is a single instance of this class. This instance is available as a property from the ScServiceProcessor. The ScSystem object is the root object that provides access to subordinate objects such as partitions, hardware units, power domains, alerts and environmental status. Example properties of this object include: Attributes, Partitions, PowerDomains, and Units. These properties return collections of objects to the client. Attributes are contained within an ScAttributeCollection object which provides access to the properties and state of the server control system object. Partitions, Power Domains and Units are contained within ScObjectCollection objects. These collection objects enumerate all instances of ScPowerDomain, ScPartition and ScUnit objects. Listing 3 demonstrates the use of ScSystem.Partitions property.

'Obtain an instance of the ScServiceProcessorRegistry set spr=CreateObject("ScServer.ScServiceProcessor-Registry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Loop through the partition collection.

for each partition in system.Partitions
   'Do per-partition processing
next
   Listing 3

Listing 4 illustrates demonstrates the use of the ScSystem.Attributes property.

'Obtain an instance of the ScServiceProcessorRegistry set spr=CreateObject("ScServer.ScServiceProcessor-Registry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Display selected system attributes.

WScript.Echo "System Name: "+system.Attributes.Item("name")+". State: "+system.Attributes.Item("state")
   Listing 4

Example methods of the ScSystem object include: CreatePartition, CreateMemoryUnit, DeleteMemoryUnit, Probe, DeletePartition, RegisterForEvents, DeregisterForEvents. CreatePartition allows a client to create a partition within the server control. This method has two parameters. The first parameter is a string that specifies the type of partition to be created. Some valid values for the type of partition include PARTITION_INTEL_32, PARTITION_INTEL_64, and PARTITION_DIAGNOSTIC. The second parameter is a string that specifies the name of the partition to be created.

DeletePartition is used to delete a partition. The single input parameter to this method is the partition object to be deleted. CreateMemoryUnit and DeleteMemoryUnit are used to create and delete logical MEM units respectively.

The Probe method is used to discover hardware units that have been recently added to the system. It updates the collection of ScUnit objects returned by the Units property The RegisterForEvents method allows a client to register for event notification when a system-related event occurs, such as when a partition is created or deleted. Listing 5 illustrates partition creation using the ScSystem object.

'Obtain an instance of the ScServiceProcessorRegistry set Spr=CreateObject("ScServer.ScServiceProcessor-Registry")

'Connect to Server control running on a Service processor named "rv-mip1".

Set mipName="rv-mip1"

set sp=Spr.Attach_2(mipName)

'Now obtain the ScSystem property from the ScServiceProcessor.

set system=sp.System

'Assume partition doesn't already exist partitionName="ScBridgeTest"

WScript.Echo "Creating:"+partitionName
  on error resume next
  system.CreatePartition "PARTITION_INTEL_32", partitionName
  if Err.number < > o then
    WScript.Echo " *Create failed with status="+CStr(Err.number)
    WScript.Echo " "+Err.Description
  Err.Clear
end if WScript.Echo "Create command complete: "+partitionName
   Listing 5

The ScSystem object (class 408) allows a client to register an event handler to receive notification when a system-related event occurs. The system event handler interface supports the following event notifications: AttributesChanged, PartitionsChanged, PowerDomainsChanged, UnitsChanged. To receive these events, a client creates an event handler class, along with individual subroutines within the class to handle each event. The handler class can process some or all of the ScSystem events. Listing 6 illustrates how to register an event handler to service system AttributesChanged events.

class EventHandler

'This event handler only handles attribute changes.

'To handle other event types, create a subroutine with the same

'as the event to handle.
  sub AttributesChanged( )
    WScript.Echo "Got an Attributes Changed event."
  end sub end class 'Obtain an instance of the ScServiceProcessorRegistry set spr=CreateObject("ScServer.ScServiceProcessor-Registry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Create and register an event handler for the System object set Handler=new EventHandler system.RegisterForEvents Handler 'Modify a system attribute and observe the AttributesChanged event message system.Attributes.Item("recoveryEnabled")=true system.DeregisterForEvents Handler
  Listing 6

The ScPartition class 410 provides access to the generalized features of the server control partition objects. There are separate derived partition classes for each partition type. There is one ScPartition instance for each partition (up to a total of eight) defined in the system configuration. ScPartition objects are maintained in a ScObjectCollection, which is available from the ScSystem.Partitions property.

The ScPartition supports the following properties: Attributes and Members. The Attributes property returns an ScAttributeCollection object. This object provides access to the properties and state of the server control partition object. Among the other partition attributes such as name, partition id, or partition type, there is a state attribute called "state". The state attribute describes the current partition state in the form of a string. The possible state values are: PARTITION_CONSTRUCTING, PARTITION_INACTIVE, PARTITION_ACTIVE_NOT_VIABLE, PARTITION_ACTIVE_VIABLE, PARTITION_INITIALIZING, PARTITION_STARTING, PARTITION_HOST_OS_STARTING,, PARTITION_RUNNING, PARTITION_STOPPING, and PARTITION_DELETED.

The Members property returns an ScObjectCollection of ScPartitionUnits. These are ScUnits that are architecturally compatible with this partition. For example, if the partition type is Intel IA32, all IA32 IPs present in the entire system would be included in the membership collection, even those that are UP in other partitions. A client can determine whether a particular unit is available for use by checking the "isOwned" attribute.

The methods of the ScPartition class include: Activate, Deactivate, Start, Stop, Up, Down, RegisterForEvents, and DeregisterForEvents. The first four methods are SC commands that change the state of the partition. In general, a partition is created (see the ScSystem class), and then activated. Hardware units such as CPU's, logical MEM's, PCI buses, etc are assigned (upped) within the partition, then the partition is started. To remove a partition, it is stopped first, all UP units are removed, (downed), the partition is deactivated, then deleted (via the ScSystem.DeletePartition method). All partition commands return an ScCommand object.

The Up and Down methods are used to assign or remove hardware units to the partition. These methods allow a client to specify a single ScPartitionUnit or array of ScPartitionUnits to be upped or downed in the partition. The RegisterForEvents method allows clients to register for event notification when partition events occur, such as when hardware units are added or removed from a partition. DeregisterForEvents deregisters the client for partition event notification. Listing 7 illustrates iterating through all partitions that are in the PARTITION_ACTIVE_VIABLE state and starting them.

'Obtain an instance of the ScServiceProcessorRegistry set spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Enumerate through each partition and start it if it is active viable for each Partition in system.Partitions
  if Partition.Attributes.Item("state")="PARTITION_ACTIVE_VIABLE" then
    Partition.Start
  end if
next
  Listing 7
  Listing 8 ups all members of a partition named "Fred" and initiates a start.

'Obtain an instance of the ScServiceProcessorRegistry set spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System partition=system.Partitions.Item("Fred")

'Up all the hardware units partition.up partition.members

'Start the partition (boots the operating system)

partition.start
  Listing 8

The ScPartition provides event notification facilities. In the example embodiment ScPartition supports the following event notifications: AttributesChanged and MembersChanged. An AttributesChanged event is fired whenever a partition attribute, such as the state or recovery options, has changed. A MembersChanged event is fired when ScUnits are added or removed from partition membership.

The code to register and handle partition event notification is similar in form to system event handling. Listing 9 demonstrates registration of an ScPartition event handler. Note that Listing 9 makes use of the ScObjectCollection.Item property.

class EventHandler
  'This event handler handles both partition event types
  sub AttributesChanged( )
    WScript.Echo "Got an attributes change event!"
  end sub
  sub MembersChanged( )
    WScript.Echo "Got an unit membership change event!"

end sub end class

'Obtain an instance of the ScServiceProcessorRegistry set spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

'Find the daytime partition.

DaytimePartition=system.Partitions.Item_2("none", "DaytimePartition")

'Create and register an event handler for the daytime partition.

set handler=new EventHandler

DaytimePartition.RegisterEventHandler handler

'Do other work here . . .

'Deregister our event handler

DaytimePartition.DeregisterEventHandler handler set handler=nothing

Listing 9

The ScUnit class 412 provides generalized access to the features of an Server control unit object. The ScUnit class supports a single property called Attributes. This property returns an ScAttributeCollection object that represents the attributes, such as name, unit type and state, of the ScUnit object. Listing 10 demonstrates displaying the properties of all ScUnits in the system.

'Obtain an instance of the ScServiceProcessorRegistry set spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set system=sp.System

Dim attrCollection for each Unit in system.Units
  Set attrCollection=Unit.Attributes
  displayAttributeCollection attrCollection, o, "UnitProperties"
Next 'displays collection via "For Each", e.g. Item(string)

sub DisplayAttributeCollection(attrCollection, ByVal indent, tagName)
  Dim indentString
  Dim attrObjByKey
  indentString=Space(indent)
  WScript.Echo indentString+ "Collection " + tagName + "has "+CStr(attrCollection.Count)+"members."
  for each attr in attrCollection
    if TypeName(attr.Value)< > "String" then
      set attrObjByKey=attrCollection.Item(attr.Key)
      WScript.Echo indentString+"Key: " +attr.Key+"is another collection."
      displayAttributeCollection attr.Value, indent+2, attr.Key
    else
      WScript.Echo indentString+"Key: "+attr.Key+", Value:"+attr.Value
    end if
  next
  WScript.Echo indentString+"End of collection"+tagName end sub set Unit=nothing Listing 10

The use of a local subroutine, DisplayAttributeCollection displays all of the attributes for each unit. A single ScAtttributeCollection can contain simple string attributes as well as nested ScAttributeCollection objects. This subroutine examines each attribute in the collection and if it detects that the attribute is another collection, calls itself recursively to process that subcollection. There are no unique events defined for the ScUnit class.

The ScPartitionUnit class 414 is the representation of an ScUnit that is a member of a partition. ScPartitionUnit, supports a number of properties, including: Attributes, Partition, and Unit. The Attributes property is similar to ScUnit, but it also includes an attribute known as "state." This attribute describes the state of a member hardware unit within the partition. The possible state attribute values are UNIT_STATE_UNKNOWN, UNIT_UP, UNIT_DN, UNIT_SU, and UNIT_RV. The "isOwned" attribute indicates whether the unit is owned by this partition.

The Partition property returns the ScPartition instance of which this unit is a member. The Unit property returns the ScUnit instance that corresponds to the given ScPartitionUnit object.

The ScMessageMonitor class 428 provides access to all unsolicited messages generated by a server control object. Unsolicited messages are either considered non-alertable or alertable. Non-alertable messages are passed to the client via an event when they occur, but are not retained by the SC bridge. Alertable messages are also delivered to client via an event, but the SC bridge retains these messages and builds an ScAlert object to encapsulate the alert information.

The ScMessageMonitor object supports one property named Alerts. The Alerts property returns an ScObjectCollection object. This object consists of a collection of ScAlert objects which were generated by a server control object, but have not yet been deleted.

The ScMessageMonitor object supports one method named RegisterForEvents. This method allows clients to be notified when events related to unsolicited messages are received from a server control object.

The ScMessageMonitor object supports the following events: AlertAttributesChanged, AlertsChanged, and MessagesReceived. The AlertAttributesChanged event is fired when the attributes for a particular alert, such as its acknowledgement status, has changed. The AlertsChanged event is fired when alerts are added or deleted to the collection of open ScAlert objects. The MessagesReceived event is fired when a non-alertable message is received from a server control object.

The ScAlert class 416 provides access to a server control alert object. The server control generates alerts to notify clients of significant server control events. Alerts are retained until a specific request is made to delete them.

A collection of the current alerts can be obtained from the ScMessageMonitor.Alerts property. The returned ScObjectCollection is a collection of ScAlert objects. To be notified of alert events, the client must register an event handler by using the RegisterForEvents method on the ScMessageMonitor class.

The ScAlert object supports the following property, Attributes. Attributes is an ScAttributeCollection of attributes for the alert. For each alert, there is a timestamp indicating when it was created, a severity indicator, headline text (a short summary of the alert), an indication if the alert has been acknowledged by another client, and an ScAttributeCollection of detailed text messages which further describe the alert. For example, the detailed text could be a collection of messages associated with a hardware fault event alert.

The ScAlert object supports the following methods: Acknowledge and Delete. The method, Acknowledge, acknowledges the alert and notifies all clients, including the acknowledging client, of the event. An alert acknowledgement does not delete the alert from the collection of alerts. The Delete method physically removes the alert from the collection of alerts.

Listing 11 illustrates how to display all current alerts for the system.

```
Class AlertEventHandler
    Sub AlertsChanged( )
        WScript.Echo "Received AlertsChanged event."
    End Sub
End Class
'Obtain an instance of the ScServiceProcessorRegistry
set     spr=CreateObject("ScServer.ScServiceProcessorRegistry")
'Connect to Server control running on a Service processor named "rv-mip1".
Set mipName="rv-mip1"
set sp=spr.Attach_2(mipName)
'Now obtain the ScSystem property from the ScServiceProcessor.
set system=sp.ScSystem
'Create an alert message monitor
set mm=system.MessageMonitor
'Define an alert event handler
set handler=new AlertEventHandler
'Register the event handler with the message monitor object
mm.RegisterForEvents handler
set alerts=mm.Alerts
count=1
for each alert in alerts
    WScript.Echo " - - - Alert #"+CStr(count)+" - - - "
    WScript.Echo "Text="+alert.attributes.item("text")
    count=count+1
next
```
Listing 11

The ScEnvironmentalMonitor class 418 provides access to the current system environmental status maintained by server control. Environmental status is provided for the following items: overall temperature status of the system, as well as the temperature reading and status of each temperature sensor; overall power status of the system, as well as the status and current voltage readings of each power supply; overall impeller (fan) status, as well as the status of each individual fan in the system cabinet; and the status of each cabinet door (open or closed).

The ScEnvironmentalMonitor object supports the property, Attributes. Attributes is an ScAttributeCollection of all environmental attributes. This is a complex collection, with many subcollections that represent the status of each impeller, power supply, temperature sensor and cabinet door in the system.

The ScEnvironmentalMonitor object supports the following methods: Start, Stop, RegisterForEvents, and DeregisterForEvents. A client calls RegisterForEvents to register an environment event handler with server control. DeregisterForEvents deregisters the event handler. The Start method starts the environmental monitoring process and indicates to server control that the client is ready to receive events. The registered event handler will receive an initial set of environmental events when Start is invoked. The Stop method is called when the client no longer wants to receive environmental events.

The ScEnvironmentalMonitor object supports a single event, AttributesChanged. The AttributesChanged event is fired whenever one or more environmental attributes has changed. There are many environmental attributes, and the client must sift through the entire ScAttributeCollection to determine which ones have changed. Listing 12 illustrates monitoring the status for all environmental objects in the system.

```
'Obtain an instance of the ScServiceProcessorRegistry
set ServiceProcessorRegistry = CreateObject("ScServer.ScServiceProcessorRegistry")
'Connect to a server control running on a Service Processor named "rv-mip1"
set     ServiceProcessor=ServiceProcessorRegistry.Attach_2 ("rv-mip1")
set system=ServiceProcessor.System
set em=system.EnvironmentalMonitor
'create and register an event handler for environmental events
set handler=new EnvironmentalEventHandler
handler.monitor=em
em.RegisterForEvents handler
'tell the server to start monitoring for environmental events.
em.start
'wait a while for environmental events
WScript.Sleep(5000)
'tell the server to stop monitoring
em.stop
```

```
WScript.Echo "Finished."+FormatDateTime(Now, vbGen-
   eralDate)
'this is the event handler class which receives environmental
   events
Class EnvironmentalEventHandler
   Sub AttributesChanged( )
      WScript.Echo "Received Environmental Attribute-
         sChanged event. " +FormatDateTime(Now, vbGen-
         eralDate)
      DisplayAttributeCollection m_monitor.Attributes, 2,
   "EnvironmentalAttributes"
   End Sub
   Sub  DisplayAttributeCollection(attrCollection,  ByVal
      indent, tagName)
      Dim indentString
      Dim attrObjByKey
      indentString=Space(indent)
      WScript.Echo indentString + "Collection "+tagName +
         " has " +CStr(attrCollection.Count)+"members."
      For Each attr in attrCollection
         if TypeName(attr.Value)< > "String" then
            set attrObjByKey=attrCollection.Item(attr.Key)
            WScript.Echo indentString +"Key: "+attr.Key+"is
               another collection."
            displayAttributeCollection attr.Value, indent+2,
               attr.Key
         else
            WScript.Echo indentString+"Key: "+attr.Key+",
               Value: "+attr.Value
         end if
      Next
      WScript.Echo indentString+"End of collection "+tag-
         Name
   end sub
   Public Property Let Monitor(value)
      set m_monitor=value
   End Property
   Private Sub Class_Initialize( )
      set m_monitor=Nothing
   End Sub
   Private m_monitor
End Class
   Listing 12
   The ScCommand class is a dynamic class which is
returned as a result of executing any commands to the Server
control, such as starting a partition or powering off a Power
Domain. The default mode of operation with regards to SC
command execution is that the command completes execu-
tion on the server before control is returned to the client.
This is the simplest mode of operation and should suffice for
most client applications. However some commands, such as
the ScSystem.Probe command, can take a long time to
complete. The client might want to perform other work
while the command execution is in progress. If this is the
case, the client can specify that all commands should be
executed asynchronously, with control immediately returned
to the client. To check the status of the asynchronous
command, the client invokes the WaitForCommand method
on the ScCommand object instance. The ScCommand object
provides a property named CommandResult which informs
the client of the current status of the command.
   Listing 13 illustrates asynchronous command completion
and error handling.

'Create the ScCommandOptions object
set sco=CreateObject("ScUtility.ScCommandOptions")
'Obtain an instance of the ScServiceProcessorRegistry
set   spr=CreateObject("ScServer.ScServiceProcessor-
   Registry")
'Connect to Server control running on a Service processor
   named "rv-mip1".
Set mipName="rv-mip1"
set sp=spr.Attach_2(mipName)
'Turn off synchronous command processing.
on error resume next
set sco.SynchronousCommands=false
'Do a system Probe
set scmd=sp.Probe
'Check command status
   if Err.number < > 0 then
      WScript.Echo "*Command "+command +"failed with
         status=0x"+CStr(Hex(Err.number))
      WScript.Echo" "+Err.Description
      Err.Clear
   end if
'Wait for the command to finish
scmd.WaitForCommand
'Check command status
   if Err.number < > 0 then
      WScript.Echo "*Command "+command+"failed with
         status=0x"+CStr(Hex(Err.number))
      WScript.Echo" "+Err.Description
      Err.Clear
   end if
Wscript.Echo "System probe command complete"
   Listing 13
```

The ScAttributeCollection class 420 supports access to the properties and states of many objects, such as ScSystem and ScPartition. The ScAttributeCollection supports the following properties: Count, Item, and Item_2. The Count property returns the number of attributes in the collection. The Item property takes a single parameter, which describes the name of a property whose value is to be obtained from the collection. The Item_2 method takes as its parameter the index of the attribute and returns its value. The returned value can be either a string or another ScAttributeCollection of attributes. A client can use generalized routines like DisplayAttributeCollection (see Listing 12) to process nested ScAttributeCollections.

The ScObjectCollection class 422 supports enumeration of ScPartition and ScUnit objects. The ScObjectCollection supports the following method, Item_2. The Item_2 method allows a client to find a given object based on an attribute name and attribute value. Item_2 takes two parameters. The first parameter is a string that denotes the name of the attribute. The second parameter is a VARIANT that represents the value of the named attribute.

Listing 14 illustrates obtaining the hardware unit named IP-0-0-0 from the ScObjectCollection returned by the ScSystem.Units property.

'Obtain an instance of the ScServiceProcessorRegistry set spr=CreateObject("ScServer.ScServiceProcessorRegistry")

'Connect to Server control running on a Service processor named "rv-mip1".

Set mipName="rv-mip1"

set sp=spr.Attach_2(mipName)

'Now obtain the ScSystem property from the ScServiceProcessor.

set System=sp.System

'System.Units returns an ScObjectCollection which provides the Item_2 method

Set ip=System.Units.Item_2 ("name", "IP-o-o-o")

WScript.Echo "Found unit "+ip.Attributes.Item("name")

Listing 14

The ScPowerDomain class 426 supports access to the generalized features of the server control power domain objects. The power domains represent the multiple power systems that may be internal to an enterprise server and can be powered on and off via software.

The ScPowerDomain supports one property named Attributes. This property returns an ScAttributeCollection which supplies the name and the power state of a particular power domain.

The ScPowerDomain provides event notification facilities. In the example embodiment ScPowerDomain supports the following event notification: AttributesChanged. An AttributesChanged event is fired whenever a power domain changes state.

The ScPowerDomain provides the following methods: PowerOn and PowerOff. These methods allow software to respectively turn on and off power to a specific power domain.

Listing 15 illustrates a process to stop all partitions and turn off all power to an enterprise server.

'Obtain an instance of the ScServiceProcessorRegistry set spr=CreateObject("ScServer.ScServiceProcessorRegistry")

'Connect to Server control running on a Service processor named "rv-mip1".

set sp=spr.Attach_2("rv-mip1")

'first stop all partitions (operating systems), down hardware units, and deactivate the partitions for each partition in System.partitions WScript.Echo "Stopping partition: "+partition.Attributes.Item("name")

partition.Stop

WScript.Echo "Downing units in partition: " + partition.Attributes.Item("name")

partition.down partition.members

WScript.Echo "Deactivating partition:"+partition.Attributes.Item("name")

partition.Deactivate next

'power off the system by Power Domain for each powerdomain in System.PowerDomains WScript.Echo "Powering down PowerDomain " + powerdomain.Attributes.Item("name")

powerdomain.PowerOff next

Listing 15

Figure 5:
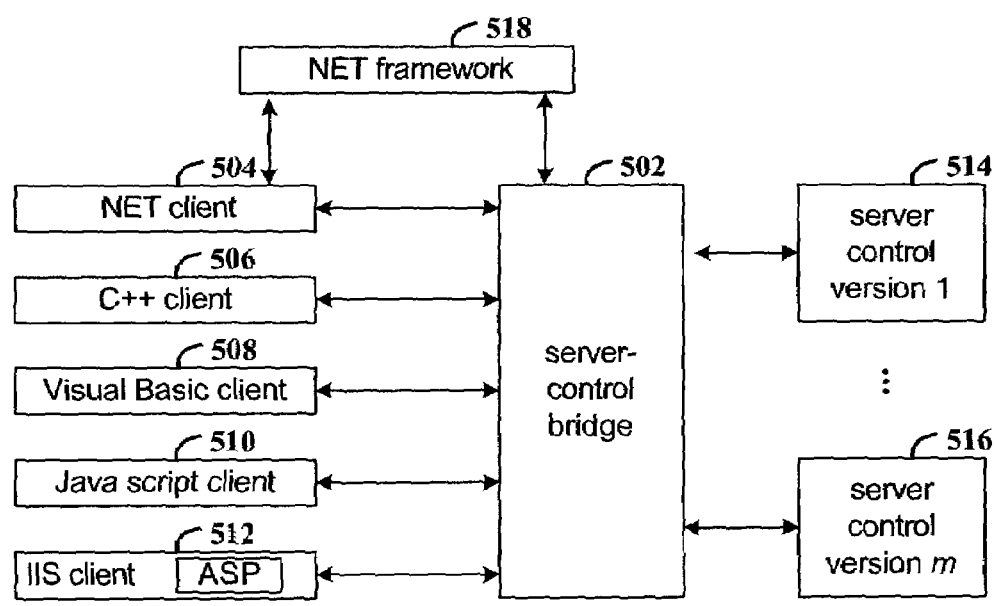
FIG. 5 is a block diagram that illustrates SC-bridge clients written in different languages and different versions of server controls in accordance with another embodiment of the invention.

FIG. 5 is a block diagram that illustrates SC-bridge clients written in different languages and different versions of server controls in accordance with another embodiment of the invention. Clients 504, 506, 508, 510, and 512 are example SC-bridge clients written in .NET, C++, Visual Basic, Java script, and ASP.Net. The .NET client 504 works in conjunction with the .NET framework 518, which also interacts with the server-control bridge 502. In one embodiment, the .Net framework is the runtime environment for the server-control bridge.

When the server-control bridge 502 connects with a server control, e.g., 514 or 516, it learns the version of the of the server control. The version of the server control controls which objects the server-control bridge instantiates. In the example embodiment, for the classes ScMessageMonitor, ScServiceProcessor, ScEnvironmentalMonitor, ScPowerDomain, ScDiagnosticTest, ScDiagnosticSubtest, ScUnit, ScPartition, and ScAlert, there are equivalent classes for each of the different versions of the server control. Thus, when a new version of the server control is implemented, the server-control bridge is updated with compatible objects for interfacing with the new server control. The SC-bridge clients are thereby isolated from changes to the server control.

Accordingly, the present invention provides, among other aspects, a method and apparatus for operating a data processing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computing arrangement for operating a server system, comprising:

a server-control element coupled to the server system and configured to submit commands to the server system to initiate management functions for managing the server system, and generate event reports in response to status data received from the server system, each event report containing status data indicative of an operational characteristic of the server system;

an interface component coupled to the server-control element, the interface component configured to register with the server-control element to receive events reports, store data from the event reports, submit to the server-control element commands to invoke the management functions in response to command requests, and provide the stored data from event reports in response to a request for the stored data; and a first-type client coupled to the interface component, the first-type client configured to generate the command requests and submit requests for data stored from the event reports.

2. The computing arrangement of claim 1, wherein the interface component is further configured to interface with a plurality of first-type clients implemented in different programming languages.

3. The computing arrangement of claim 1, wherein the interface component is further configured to interface with a plurality of versions of the server-control element.

4. The computing arrangement of claim 1, wherein the management functions include at least one of assigning a name to the server, establishing server firmware, defining a recovery behavior, and managing power domains of the server.

5. The computing arrangement of claim 1, wherein the management functions include installing, creating, and deleting partitions of the server system, wherein a partition includes a set of hardware resources of the server system that are managed by an instance of an operating system.

6. The computing arrangement of claim 1, wherein the management functions include controlling access to hardware units.

7. The computing arrangement of claim 1, wherein the management functions include managing alert-type messages from the server system.

8. The computing arrangement of claim 1, further comprising a second-type client coupled to the server control element, the second-type client configured to register with the server-control element to receive events reports, store data from the event reports, submit to the server-control element commands to invoke the management functions, and process data from event reports.

9. The computing arrangement of claim 1, wherein:
the server-control element is implemented with an object model;
the interface component includes a first class from which the first-type client instantiates a first object and calls a method of the first object for connecting to the server-control element and instantiating a second object of a second class; and
the second object of the second class provides access to objects of the object model of the server-control element.

10. A method for operating a server system via a server-control element coupled to the server system, comprising:
providing access to management functions for managing the server system via the server-control element;
generating event reports in response to status data received by the server-control element from the server system, wherein each event report contains status data indicative of an operational characteristic of the server system;
registering by an interface component with the server-control element for the server-control element to transmit event reports to the interface component;
storing data from the event reports by the interface component;
generating by a client, data requests for selected stored data from event reports;
submitting the data requests to the interface component;
transmitting the selected stored data to the client in response to the data requests;
generating command requests by the client and submitting the command requests to the interface component;
submitting from the interface component to the server-control element commands to invoke the management functions in response to command requests; and
submitting commands from the server-control element to the server system to initiate the management functions.

11. The method of claim 10, further comprising establishing connections between the interface component and a plurality of clients implemented in different programming languages.

12. The method of claim 10, further comprising adapting interactions between the interface component and a server-control element in response to a version of the server-control element.

13. The method of claim 10, wherein the management functions include at least one of assigning a name to the server, establishing server firmware, defining a recovery behavior, and managing power domains of the server.

14. The method of claim 10, wherein the management functions include installing, creating, and deleting partitions of the server system, wherein a partition includes a set of hardware resources of the server system that are managed by an instance of an operating system.

15. The method of claim 10, wherein the management functions include controlling access to hardware units.

16. The method of claim 10, wherein the management functions include managing alert-type messages from the server system.

17. The method of claim 10, wherein the server-control element is implemented with an object model, further comprising:
instantiating a first object from a first class of the client;
connecting to the server-control element via a method of the first object;
instantiating a second object of a second class via a method of the first object, wherein the second object provides access to objects of the object model of the server-control element.

18. An apparatus for operating a server system via a server-control element coupled to the server system, comprising:
means for providing access to management functions for managing the server system via the server-control element;
means for generating event reports in response to status data received by the server-control element from the server system, wherein each event report contains status data indicative of an operational characteristic of the server system;
means for registering by an interface component with the server-control element for the server-control element to transmit event reports to the interface component;
means for storing data from the event reports by the interface component;
means for generating by a client, data requests for selected stored data from event reports;
means for submitting the data requests to the interface component;
means for transmitting the selected stored data to the client in response to the data requests;
means for generating command requests by the client and submitting the command requests to the interface component;
means for submitting from the interface component to the server-control element commands to invoke the management functions in response to command requests; and
means for submitting commands from the server-control element to the server system to initiate the management functions.

* * * * *